US010819225B2

(12) United States Patent
Giguere et al.

(10) Patent No.: US 10,819,225 B2
(45) Date of Patent: Oct. 27, 2020

(54) SINGLE-STAGE CURRENT-FED CLAMPED SERIES RESONANT POWER FACTOR CORRECTED CONVERTER

(71) Applicant: General Electric Company, Schenectady, NY (US)

(72) Inventors: Francois Giguere, Montreal (CA); Yehuda Daniel Levy, Jerusalem (IL); Mohamed Cherif Ghanem, Pierrefonds (CA)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 16/296,131

(22) Filed: Mar. 7, 2019

(65) Prior Publication Data

US 2019/0267892 A1 Aug. 29, 2019

Related U.S. Application Data

(63) Continuation of application No. 15/154,059, filed on May 13, 2016, now abandoned.

(51) Int. Cl.
*H02M 1/42* (2007.01)
*H02M 3/335* (2006.01)
(Continued)

(52) U.S. Cl.
CPC .......... *H02M 1/4241* (2013.01); *H02M 1/08* (2013.01); *H02M 1/14* (2013.01); *H02M 3/33507* (2013.01); *H02M 3/33515* (2013.01)

(58) Field of Classification Search
CPC ...... H02M 1/08; H02M 1/14; H02M 3/33507; H02M 3/33515
See application file for complete search history.

(56) References Cited

U.S. PATENT DOCUMENTS

| 5,140,510 A | 8/1992 | Myers |
| 5,233,509 A | 8/1993 | Ghotbi |

(Continued)

FOREIGN PATENT DOCUMENTS

| CN | 101022247 A | 8/2007 |
| CN | 103283115 A | 9/2013 |

OTHER PUBLICATIONS

Glaser et al., "Steady-State Analysis of the Constant-Frequency Clamped Series Resonant Converter", IEEE Transactions on Aerospace and Electronic Systems, vol. 30, Issue 1, pp. 135-143 (Jan. 1994).

(Continued)

*Primary Examiner* — Jue Zhang
*Assistant Examiner* — David A. Singh
(74) *Attorney, Agent, or Firm* — Buckley, Maschoff & Talwalkar LLC

(57) ABSTRACT

The method, apparatus and system of a single-stage current-fed clamped series resonant power factor corrected (PFC) converter CF-CSRC provides power conversion and current regulation. The CF-CSRC system may be implemented in a single-stage isolated topology for high efficiency unity power factor correction (PFC) converter applications. Moreover, the CF-CSRC system combines the intrinsic advantages of the classical clamped series resonant converter while mitigating drawbacks by using an integrated boost input current shaper.

20 Claims, 12 Drawing Sheets

(51) Int. Cl.
*H02M 1/08* (2006.01)
*H02M 1/14* (2006.01)

(56) References Cited

U.S. PATENT DOCUMENTS

| | | | |
|---|---|---|---|
| 5,959,849 A * | 9/1999 | Batarseh | H02M 1/4258 |
| | | | 323/222 |
| 6,625,042 B2 | 9/2003 | Tolle et al. | |
| 8,345,450 B2 | 1/2013 | Yan et al. | |
| 8,611,115 B2 | 12/2013 | Figge et al. | |
| 8,698,354 B2 | 4/2014 | Ghosh et al. | |
| 2001/0036090 A1 | 11/2001 | Halberstadt | |
| 2004/0008016 A1 * | 1/2004 | Sutardja | H02M 1/088 |
| | | | 323/283 |
| 2004/0146101 A1 * | 7/2004 | Pearce | H02M 3/157 |
| | | | 375/238 |
| 2007/0247877 A1 * | 10/2007 | Kwon | H02M 3/3372 |
| | | | 363/25 |
| 2008/0116871 A1 * | 5/2008 | Li | H02M 3/157 |
| | | | 323/283 |
| 2008/0198638 A1 * | 8/2008 | Reinberger | H02M 3/3376 |
| | | | 363/74 |
| 2011/0199045 A1 * | 8/2011 | Hui | H02J 7/025 |
| | | | 320/108 |
| 2012/0112547 A1 | 5/2012 | Ghosh et al. | |
| 2012/0275196 A1 * | 11/2012 | Chapman | H02J 3/383 |
| | | | 363/17 |
| 2012/0300502 A1 | 11/2012 | Shimada et al. | |
| 2013/0016534 A1 | 1/2013 | Ishikura et al. | |
| 2013/0076135 A1 | 3/2013 | Zhu et al. | |
| 2013/0127358 A1 | 5/2013 | Yao | |
| 2013/0147280 A1 * | 6/2013 | Oettinger | H02J 7/025 |
| | | | 307/104 |
| 2013/0260676 A1 * | 10/2013 | Singh | H04B 5/0037 |
| | | | 455/41.1 |
| 2014/0117878 A1 | 5/2014 | Prodic et al. | |
| 2014/0175894 A1 * | 6/2014 | Endo | H02J 50/12 |
| | | | 307/104 |
| 2014/0268902 A1 | 9/2014 | Bucheru | |
| 2015/0333640 A1 * | 11/2015 | Persson | H02M 3/33538 |
| | | | 363/21.04 |
| 2015/0349636 A1 * | 12/2015 | Bodano | H02M 3/158 |
| | | | 323/271 |
| 2016/0043634 A1 | 2/2016 | Bemat et al. | |
| 2017/0271993 A1 | 9/2017 | Jitaru | |

OTHER PUBLICATIONS

O'Sullivan, D.L., et al., "A Family of Single-Stage Resonant AC/DC Converters With PFC", IEEE Transactions on Power Electronics, vol. 24, Issue 2, pp. 398-408 (Feb. 2009).

Sabate, J.A. and Lee, F.C.Y., "Off-Line Application of the Fixed-Frequency Clamped-Mode Series Resonant Converter", IEEE Transactions on Power Electronics, vol. 6, Issue 1, pp. 39-47 (Jan. 1991).

Tsai, F.S., and Lee, F.C., et al., "A complete Dc characterization of a Constant-Frequency, Clamped-Mode, Series-Resonant Converter", IEEE PESC '88 Record, vol. 6, pp. 987-996 (Apr. 1988).

Tsai et al., "Constant-Frequency Clamped-Mode Resonant Converters", IEEE Transactions on Power Electronics, vol. 3, Issue 4, pp. 460-473 (Oct. 1988).

Non-Final Office Action towards U.S. Appl. No. 15/154,059 dated Sep. 7, 2018.

Office Action Issued in connection with corresponding Chinese Application No. 201710339373.5 dated May 7, 2020.

Shih-Yu Chen et al., "Analysis and Design of Single-Stage AC/DC LLC Resonant Converter", IEEE Transactions on Industrial Electronics, vol. 59, Issue 3, pp. 1538-1544 (Mar. 2012).

* cited by examiner

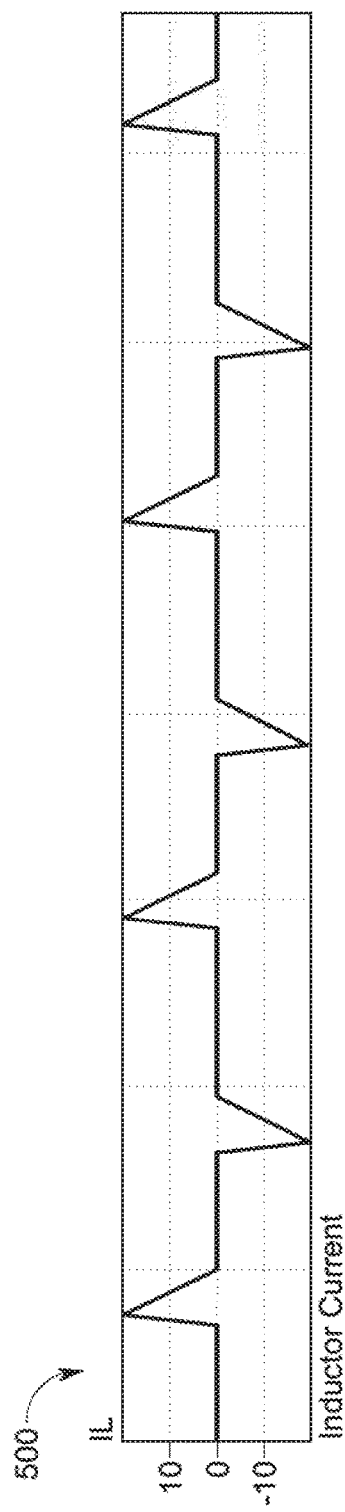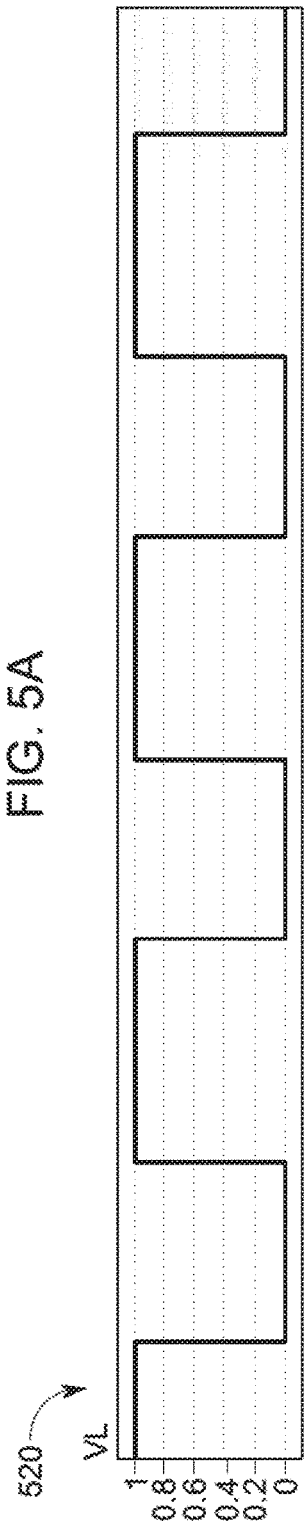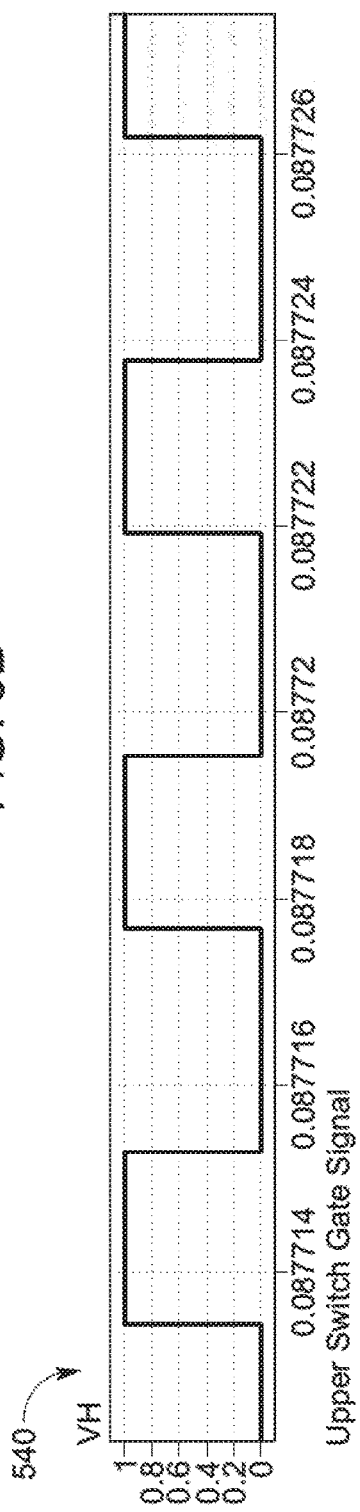
FIG. 5A
FIG. 5B
FIG. 5C

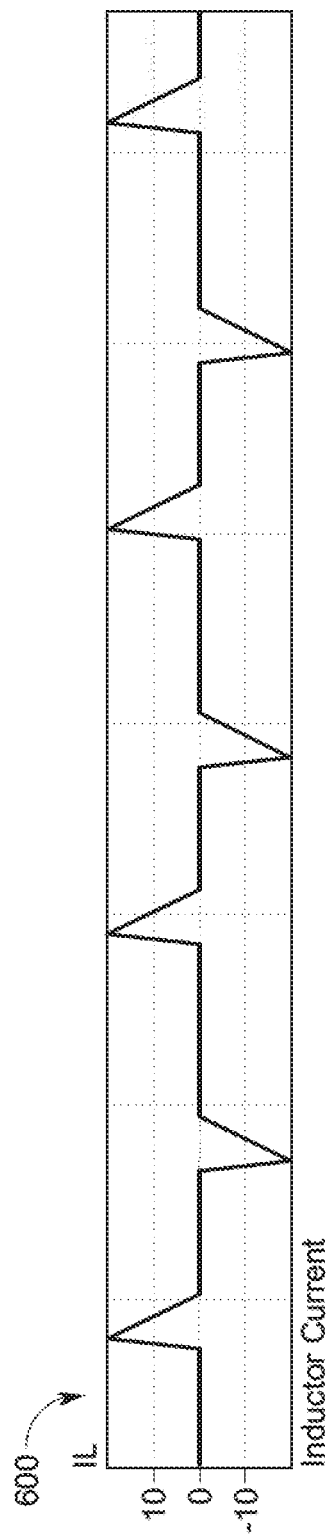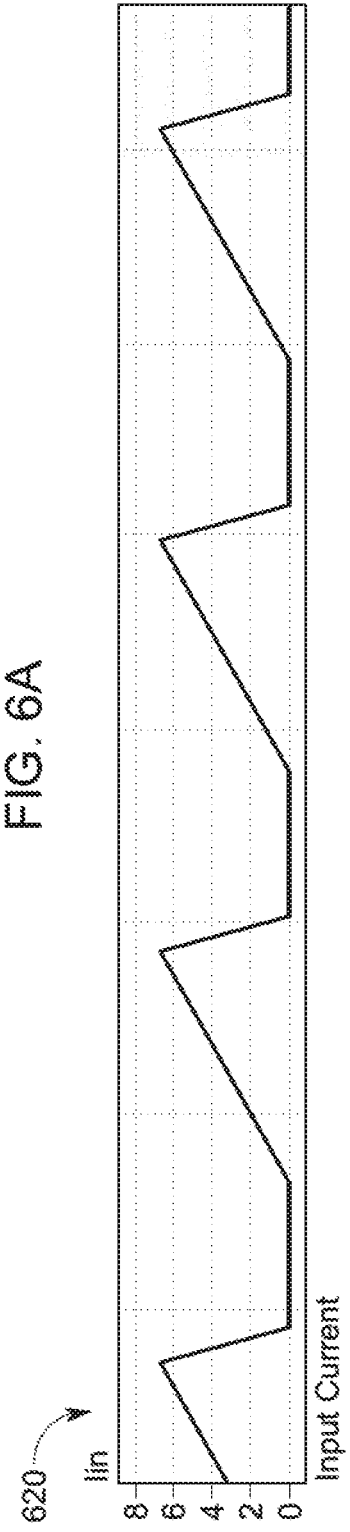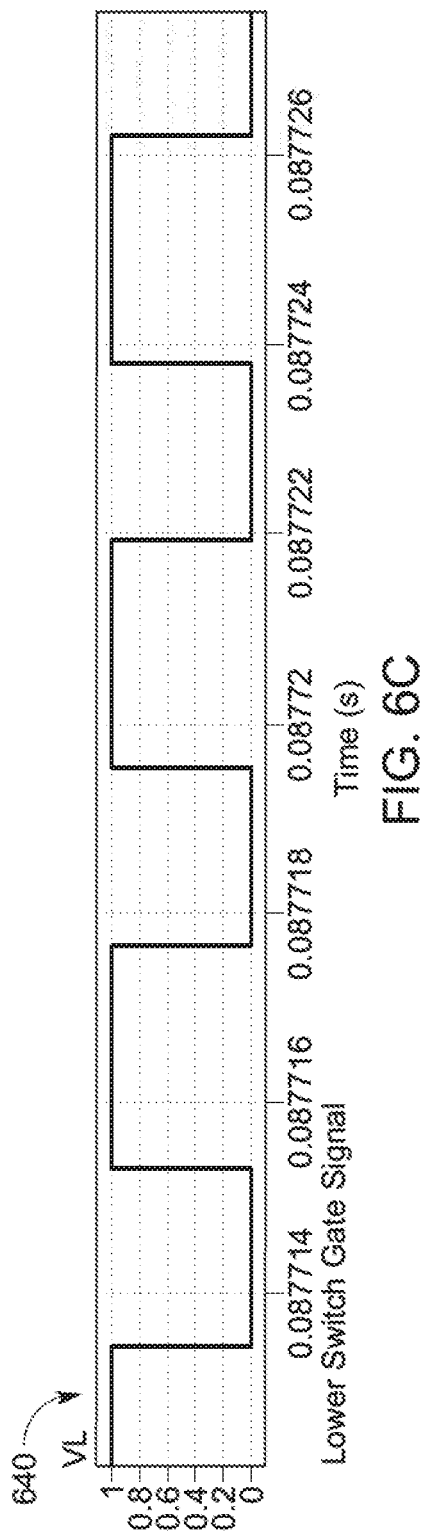

1100

| Operating Parameters / Performance Metrics | |
|---|---|
| Maximum Switching Frequency  250 kHz<br>Minimum Switching Frequency    50 kHz<br>$C_{res}$ = 3nF ; $L_{res}$ = 2uH ; $L_{in}$ = 30uH ; $N_s$ = 1 ; $N_p$ = 4 | |
| Input Voltage = 90Vac<br><br>Vbulk Voltage Maximum = 600V<br><br>Vbulk Voltage Minimum = 200V | Input Voltage = 305Vac<br><br>Vbulk Voltage Maximum = 600V |
| Nominal Power = 275W<br><br>Minimum Power = 6W<br><br>Range of Power = 1:54<br><br>Power Factor (PF) = Unity<br><br>ZCS = Yes | Nominal Power = 275W<br><br>Minimum Power = 54W<br><br>Range of Power = 1:5<br><br>Power Factor (PF) = Unity<br><br>ZCS = Yes |

SINGLE-STAGE CURRENT-FED CLAMPED SERIES RESONANT POWER FACTOR CORRECTED CONVERTER

This application is a continuation of prior-filed, commonly-owned, copending application Ser. No. 15/154,059, filed 13 May 2016, which is hereby incorporated by reference.

TECHNICAL FIELD

Embodiments generally relate to power conversion and current regulation. More particularly, embodiments relate to a single-stage isolated topology for high efficiency unity power factor correction (PFC) converter applications.

BACKGROUND

The classical clamped series resonant converter (CSRC) includes a resonant stage circuit that may only operate if the input voltage is higher than the reflected output voltage, essentially operating as a step-down converter. Because the alternating current (AC) line inherently decreases to zero periodically, the classical CSRC has poor power factor correction (PFC) and total harmonic distortion (THD) capabilities. Although poor PFC and THD drawbacks may be partially mitigated by tuning the power transformer turns ratio, the usable range of the converter is limited and also generates high input peak currents. Also the double-stage approach of a classical CSRC is more expensive, less efficient and less compact because of the number of components. A flyback converter is less efficient, results in large output current ripple and is less compact & reliable due to the need for large electrolytic output capacitors. Non-isolated single stage converters (e.g., a single-ended primary-inductor converter SEPIC) produce a large output current ripple, are less compact, and not suitable for many applications due to safety concerns of non-isolated topologies.

BRIEF DESCRIPTION OF THE DRAWINGS

The various advantages of the embodiments of the present invention will become apparent to one skilled in the art by reading the following specification and appended claims, and by referencing the following drawings, in which:

FIGS. 5A, 5B and 5C are illustrations of examples of an inductor resonant current waveform, a lower switch gate signal and an upper switch gate signal according to an embodiment;

FIGS. 6A, 6B and 6C are illustrations of examples of waveforms for an inductor current and an input current, and a lower switch gate signal in discontinuous conduction mode (DCM) according to an embodiment;

FIG. 11 is an illustration of an example table of operating parameters and performance metrics according to an embodiment.

DETAILED DESCRIPTION

Figure 1:
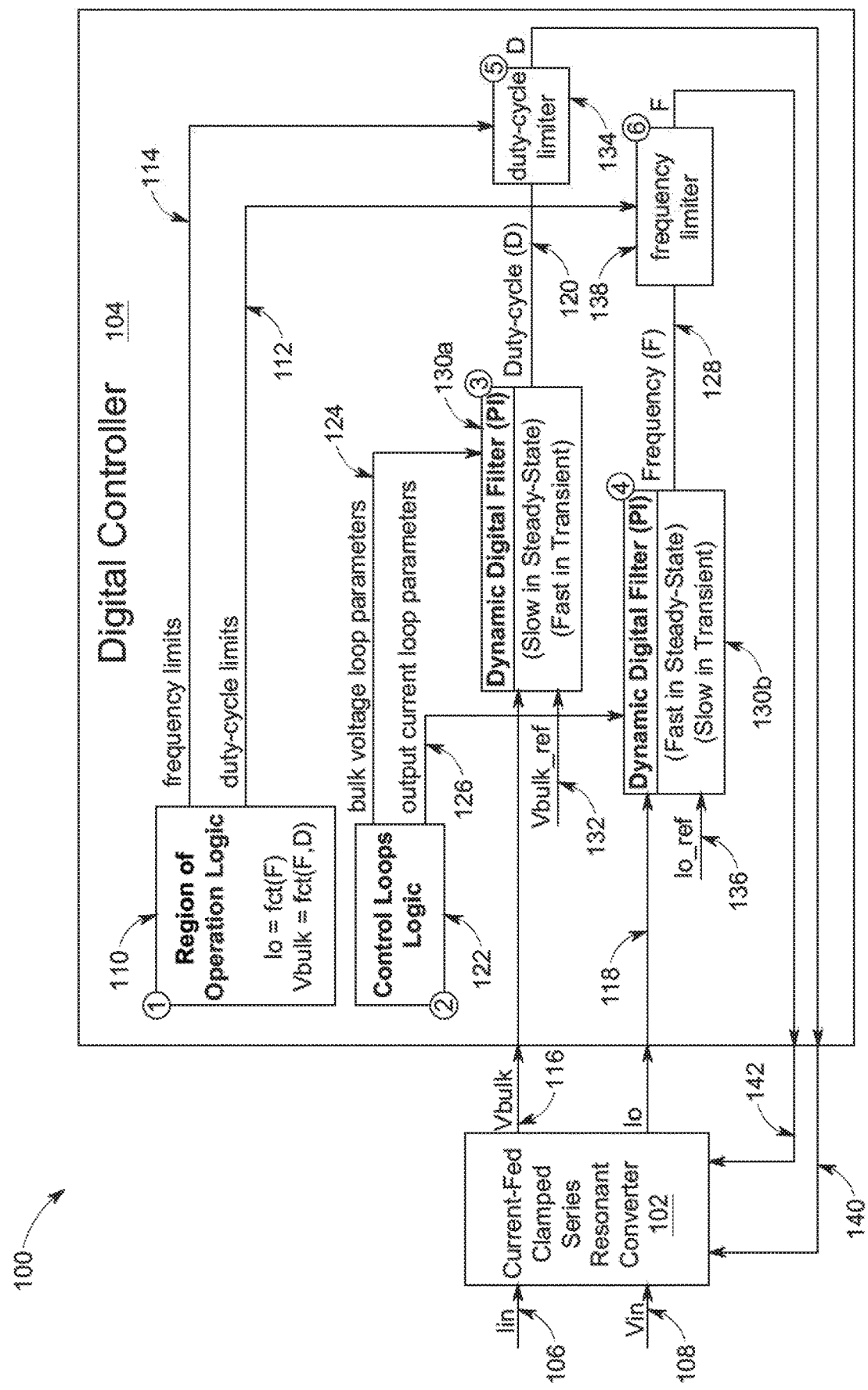
FIG. 1 is a block diagram of an example of a current-fed clamped series resonant converter (CF-CSRC) system according to an embodiment.

Turning now to FIG. 1, the block diagram illustrates an example of a current-fed clamped series resonant converter (CF-CSRC) system 100 according to an embodiment. The CF-CSRC system 100 may include a CF-CSRC 102 coupled to and/or integrated with a digital controller 104. The CF-CSRC 102 may receive an alternating current input current 106 and an input voltage 108 from an electrical power supply (not shown). The CF-CSRC 102 may convert the input current 106 and the input voltage 108 to direct current based on a duty-cycle and a switching frequency for a first switch and a second switch (not shown).

The digital controller 104 and/or components of the digital controller 104 may be implemented in hardware and/or logic in a processor, to provide feedback control to the CF-CSRC 102. The digital controller 104 may include a limits calculator 110 (e.g., calculates limits to operate the CF-CSRC input current and resonant current in DCM) to calculate duty-cycle limits 112 and switching frequency limits 114 based on the bulk voltage 116 (e.g., generated by the CF-CSRC 102) and the input voltage 106. The CF-CSRC system may operate so that the peak input voltage is less than the bulk voltage.

The limits calculator 110 may be implemented in hardware and/or logic in a processor. The duty-cycle limits 112 and switching frequency limits 114 may be calculated by the limits calculator 110 to decouple generation of the output current 118 (e.g., generated by the CF-CSRC 102) from the duty-cycle 120 (e.g., operating the CF-CSRC 102 in DCM). Decoupling control of the output current 118 from the duty-cycle may allow the CF-CSRC system 100 to alter the switching frequency in order to change the output current, while altering the duty-cycle may not affect the output current, altering the duty-cycle and frequency may change the bulk voltage.

The digital controller 104 may include a control parameters calculator 122 to calculate control parameters including bulk voltage parameters 124 and output current parameters 126 to determine and/or use to control the CF-CSRC system 100 in a region of operation (e.g., boost converter and CSRC in discontinuous conduction mode (DCM)). The control parameters calculator 122 may be implemented in hardware and/or logic in a processor. The CF-CSRC 102 may generate the bulk voltage 116 based on the duty-cycle 120 and the switching frequency 128, and generate the output current 118 based on the switching frequency 128 by actuating a first switch and a second switch of the CF-CSRC 102 at the switching frequency 128 and the duty-cycle 120. The duty-cycle 120 and the switching frequency 128 may be actuated, for example, by the digital controller based on the duty-cycle limits 112 and switching frequency limits 114.

The digital controller 104 may include a digital filter 130a, 130b (e.g., a proportional-integral (PI) filter) that may conduct a comparison between the bulk voltage 116 and a bulk voltage reference 132. The digital filter 130a, 130b may determine that steady-state operation has been reached when the bulk voltage stabilizes based on the comparison between the bulk voltage 116 and the bulk voltage reference 132 (e.g., bulk voltage at a first time and a second time) and/or the bulk voltage parameters 124 and the output current parameters 126, and slow adjustment of the duty-cycle 120 relative to adjustment of the switching frequency 128 (e.g., adjust the duty-cycle 120 at a slower rate relative to a rate of adjusting the switching frequency 128). During steady-state of the bulk voltage 116 and/or the output current 118, adjustment of the switching frequency 128 may be at a faster rate relative to a rate of adjustment of the duty-cycle 120. Conversely, during transient state of the bulk voltage 116 and/or the output current 118, adjustment of the duty-cycle 116 may be at a faster rate relative to a rate of adjustment of the switching frequency 128. The digital controller 104 may include a duty-cycle limiter 134 that may conduct a comparison between the duty-cycle 116 and duty-cycle limits 112, and adjust the duty-cycle 116 to an adjusted duty-cycle 140 based on the comparison between the duty-cycle 120 and the duty-cycle limits 112 (e.g., if the duty-cycle 120 is approximately at or outside one or more of the duty-cycle limits 112).

The digital filter 130a, 130b may conduct a comparison between the output current 118 and an output current reference 136 (e.g., output current at a first time and a second time). The digital filter 130a, 130b may determine a transient-state when the output current 118 changes based on the comparison between the output current 118 and an output current reference 136 (e.g., output current at a first time and a second time) and/or the bulk voltage parameters 124 and the output current parameters 126, and slow adjustment of switching frequency 128 relative to adjustment of duty-cycle 120 (e.g., adjust the switching frequency 128 at a slower rate relative to a rate of adjusting the duty-cycle 120). During transient-state of the bulk voltage 116 and/or the output current 118, adjustment of the switching frequency 128 may be at a slower rate relative to a rate of adjustment of the duty-cycle 120. Conversely, during steady-state of the bulk voltage 116 and/or the output current 118, adjustment of the switching frequency 128 may be at a faster rate relative to a rate of adjustment of the duty-cycle 120. The digital controller 104 may include a frequency limiter 138 that may conduct a comparison between the switching frequency 128 and switching frequency limits 114, and adjust the switching frequency 128 to an adjusted switching frequency 142 based on the comparison between the switching frequency 128 and switching frequency limits 114 (e.g., if the switching frequency 128 is approximately at or outside one or more of the switching frequency limits 114). Increasing the switching frequency 128 may increase the output current 118, while decreasing the switching frequency 128 may decrease the output current 118. For example, when a first switch is switched on and a second switch is switched off a burst of current (e.g., reaching a peak current) travels across/through the first switch, and vice versa. The time the switch is on (e.g., the duty-cycle) may be longer than the time for the burst of current to travel across/through the switch (e.g., a transistor or thyristor). The more often the burst of current is allowed to travel across/through the switches the greater the output current, and conversely the less often the burst of current is allowed to travel across/through the switches the less the output current. For another example, sending one pulse per second (e.g., a fixed period of time) across the first switch or the second switch produces a small amount of output current, and alternatively sending a million pulses in a second (e.g., a fixed period of time) across the switches produces a large amount of output current. The CF-CSRC 102 may use duty-cycle 120, 140 and the switching frequency 128, 142 to dynamically generate the bulk voltage 116 and/or output current 118 over a range of input currents 106 and/or input voltages 108.

Figure 2:
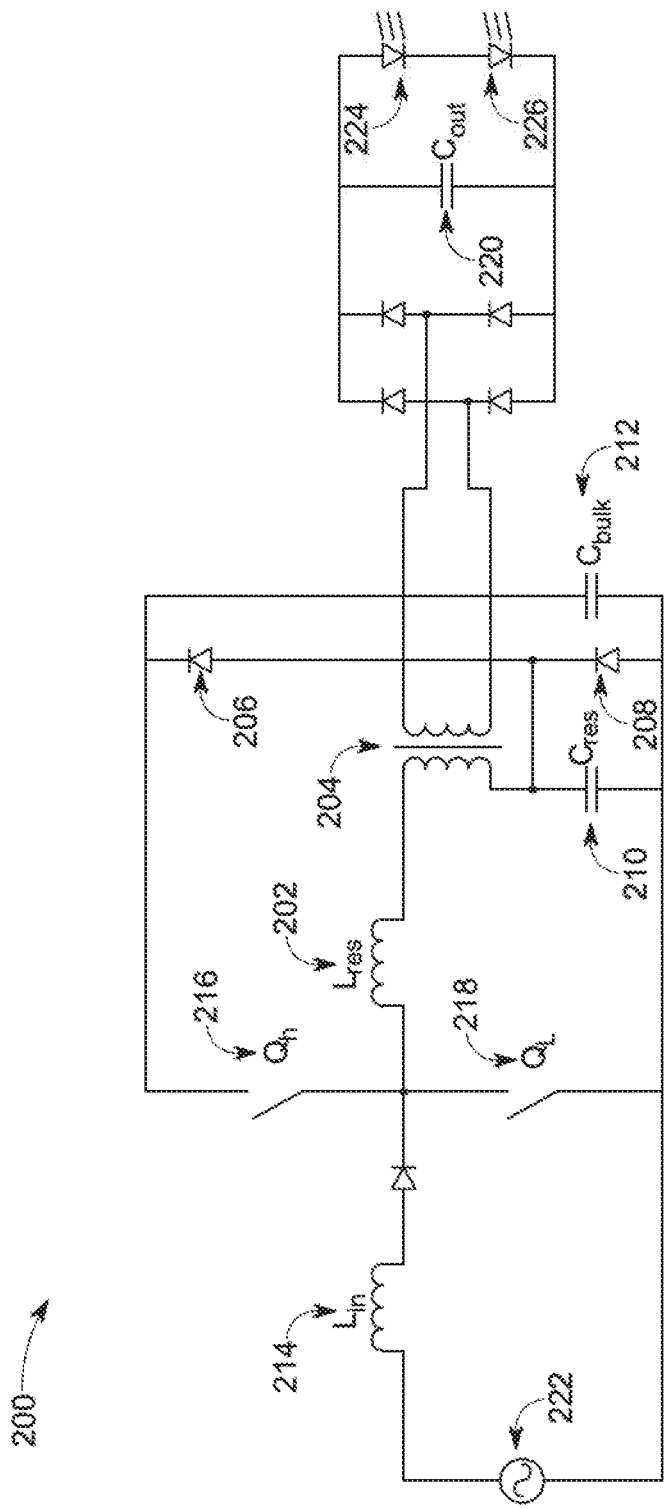
FIG. 2 is a block diagram of an example of a CF-CSRC system according to an embodiment.

Turning now to FIG. 2, is a block diagram of an example of a CF-CSRC system 200 according to an embodiment. The CF-CSRC system 200 may implement a single stage topology with galvanic isolation that includes a clamped series resonant converter (CSRC) portion integrated with a boost converter portion. The single stage topology of the CF-CSRC system 200 may operate as a boost converter and a client series resonant converter simultaneously, performing power conversion and current regulation. The CF-CSRC system 200 may implement duty-cycle and frequency controls to stay in a desired region of operation ((e.g., boost converter and CSRC in discontinuous conduction mode (DCM)) to decouple bulk voltage and output current using a bulk voltage control loop and an output current control loop (e.g., controlled by a controller implemented in hardware and/or logic in a processor) to balance the power supply.

The CSRC may include a resonant inductor $L_{res}$ 202, transformer 204, a first diode 206 and second diode 208 and a resonant capacitor $C_{res}$ 210. The boost converter may include and/or be formed by a bulk capacitor $C_{bulk}$ 212 (e.g., a DC link capacitor) and an input inductor $L_{in}$ 214. The boost converter may be controlled by a duty-cycle loop (e.g., implemented in hardware and/or logic of a processor) to maintain a voltage at the bulk voltage $V_{bulk}$ at the bulk capacitor $C_{bulk}$ 212. The bulk voltage $V_{bulk}$ may be affected by the frequency and duty-cycle of a first switch 216 (e.g., an upper switch $Q_h$) and a second switch 218 (e.g., a lower switch $Q_l$) coupled to a digital controller (not shown). The bulk voltage at the bulk capacitor $C_{bulk}$ 212 may be increased to increase the output power of the converter. The switches 216, 218 may be complimentary with some amount of adjustable dead time between the switches (e.g., dynamically adjustable by digital controller implemented in hardware and/or logic in a processor). The CF-CSRC system 200 may generate an output current at an output capacitor $C_{out}$ 220, and the output current at $C_{out}$ may be affected by a frequency loop/switching frequency loop (e.g., implemented in hardware and/or logic of a processor). The first switch 216 (e.g., an upper switch $Q_h$) and the second switch 218 (e.g., a lower switch $Q_l$) may be operated to insure discontinuous conduction mode (DCM) to control the CSRC and boost converter, the AC input current 222, bulk voltage $V_{bulk}$ at $C_{bulk}$ 212 and direct current (DC) output current at $C_{out}$ 220. Operating in discontinuous conduction mode, the inductor current in the energy transfer may reach zero level, and not cut the resonance.

The duty-cycle control loop may operate and/or analyze and/or sample the bulk voltage $V_{bulk}$ at the bulk capacitor $C_{bulk}$ 212 at a relatively faster rate than the frequency loop for the output current at $C_{out}$ 220 in order to respond/compensate to/for changes in switching frequency occurring to maintain the output current at $C_{out}$ 220. For example, if the output current control loop determines/decides to decrease the output current at $C_{out}$ 220, then the duty-cycle control loop adjusts the duty-cycle to maintain the bulk voltage $V_{bulk}$ at the bulk capacitor $C_{bulk}$ 212. The duty-cycle loop may be faster than the frequency loop (e.g., during transient state of operations for the CF-CSRC system 200). Under steady state operations for the CF-CSRC system 200, where no changes/fluctuations occur in the bulk voltage $V_{bulk}$ and the output current at $C_{out}$ 220, the relative speed of the frequency loop may be faster than the duty-cycle loop in order to reduce ripple (e.g., fluctuations) at the output current at $C_{out}$ 220. The CF-CSRC system 200 may also include another control loop to coordinate control between the duty-cycle loop and the frequency loop. Accordingly, the CF-CSRC system 200 may use the output current at $C_{out}$ 220 to power one or more devices and/or components 224, 226 (e.g., light emitting diodes (LEDs)) with efficient flat (e.g., little or no current ripple).

The duty-cycle loop and/or the frequency loop may dynamically control the frequency and duty-cycle operating ranges (e.g., change the duty-cycle and frequency limits) depending on the bulk voltage and input voltage (e.g., line-in voltage). For example, if the bulk voltage is higher the controller may allow the switching frequency to increase, providing a dynamic range of acceptable switching frequencies.

Figure 3:
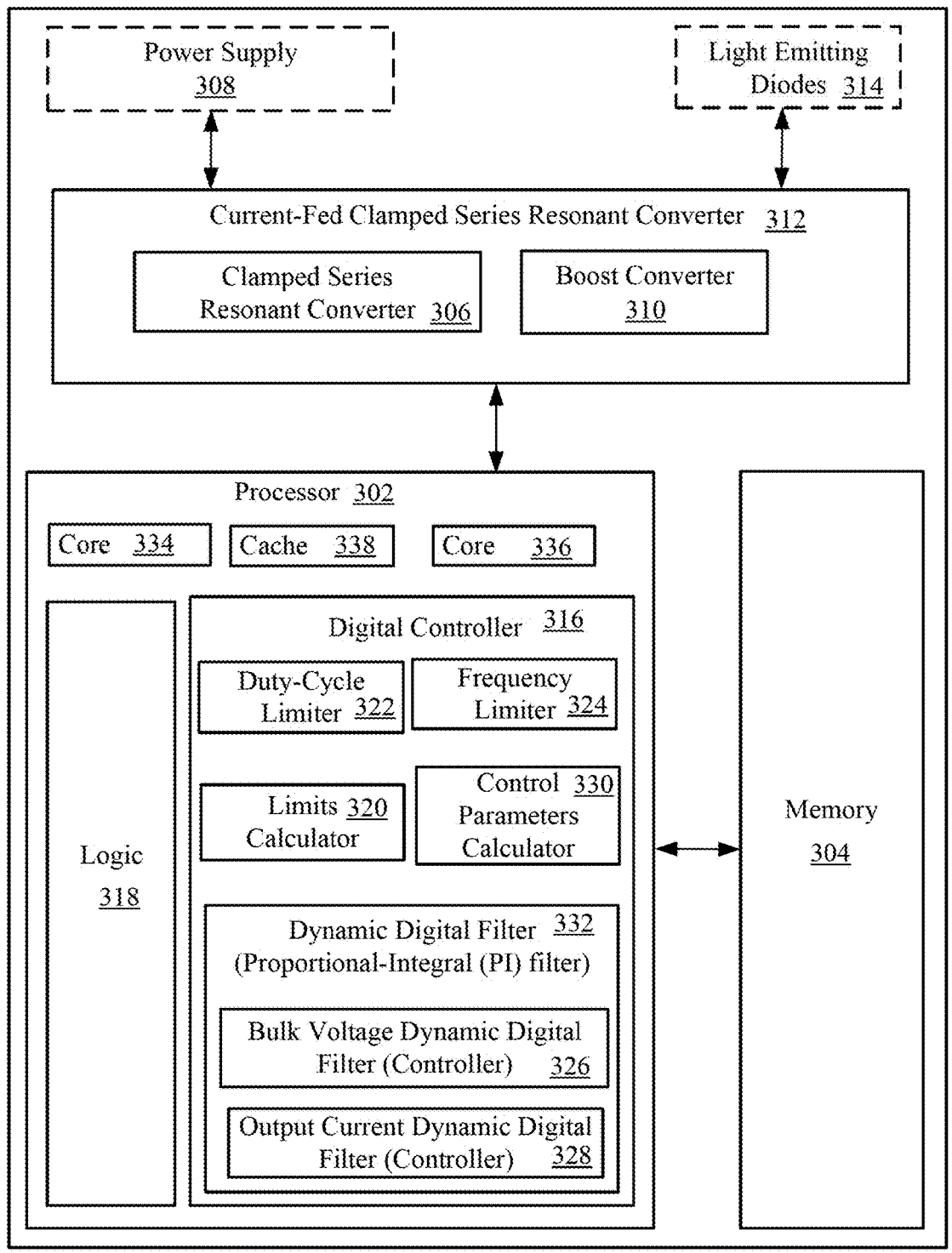
FIG. 3 is a block diagram of an example of a CF-CSRC system according to an embodiment.

Turning now to FIG. 3, is a block diagram of an example of a CF-CSRC system 300 according to an embodiment. The CF-CSRC system 300 may include a processor 302 and memory 304 coupled to the processor 302. The CF-CSRC system 300 may also include a first switch and a second switch (e.g., not shown), a clamped series resonant converter (CSRC) 306, and an electrical power supply 308 (e.g., may optionally be external to the CF-CSRC system 300). The CSRC 306 may receive an alternating current input current and an input voltage from the electrical power supply 308. The CSRC 306 may convert the input current and the input voltage to direct current based on a duty-cycle and a switching frequency for the first switch and the second switch. The CF-CSRC system 300 may also include a boost converter 310 to generate a bulk voltage based on the duty-cycle and the switching frequency. The boost converter 310 may include a bulk capacitor where the bulk voltage is generated. The CSRC 306 may be integrated with the boost converter 310 to form a current-fed clamped series resonant converter (CF-CSRC) 312 implemented in a single stage topology to generate an output current based on the switching frequency to provide one or more devices and/or components 314 (e.g., light emitting diodes (LEDs)) with efficient flat power (e.g., little or no current ripple). The CSRC 306 integrated with the boost converter 310 may improve power factor and total harmonic distortion (THD) during AC input line inherently decreasing to zero. Devices and/or components 314 may optionally be external to the CF-CSRC system 300. The CF-CSRC 312 may include an output capacitor where the CF-CSRC 312 generates the output current.

The processor 302 and/or the memory 304 may include a digital controller 316 to control actuation of the first switch and the second switch at the switching frequency and the duty-cycle. The digital controller 316 may be implemented in hardware, the memory 304 and/or logic 318 in the processor 302. The digital controller 316 may include a limits calculator 320 to calculate duty-cycle limits and switching frequency limits for the first switch and the second switch based on the operating conditions of the converter (e.g., control parameters, and the input voltage and the bulk voltage used to calculate the duty-cycle and frequency limits). The digital controller 316 may include a duty-cycle limiter 322 to limit the duty-cycle based on the duty-cycle limits, and a switching frequency limiter 324 to limit the switching frequency based on the switching frequency limits. The duty-cycle limiter 322 may conduct a comparison between the duty-cycle and duty-cycle limits, and adjust the duty-cycle to an adjusted duty-cycle based on the comparison between the duty-cycle and the duty-cycle limits (e.g., if the duty-cycle is approximately at or outside one or more of the duty-cycle limits). The frequency limiter 324 that may conduct a comparison between the switching frequency 128 and switching frequency limits, and adjust the switching frequency to an adjusted switching frequency based on the comparison between the switching frequency and switching frequency limits (e.g., if the switching frequency is approximately at or outside one or more of the switching frequency limits).

The digital controller 316 may further include a dynamic digital filter 332 (e.g., a proportional-integral (PI) filter, discussed below) which may include a bulk voltage dynamic digital filter 326 and an output current dynamic digital filter 328 (e.g., also referred to as a bulk voltage controller and an output current controller). The bulk voltage dynamic digital filter 326 (e.g., referred to as the bulk voltage controller) may conduct a comparison between the bulk voltage and a bulk voltage reference (e.g., bulk voltage at a first time and a second time). The switching frequency limiter 324 may adjust the switching frequency and the duty-cycle limiter 322 may adjust the duty-cycle to adjust the bulk voltage based on the comparison between the bulk voltage and the bulk voltage reference.

The output current dynamic digital filter 328 (e.g., also referred to as the output current controller) may conduct a comparison between the output current and an output current reference (e.g., output current at a first time and a second time). The switching frequency limiter 324 may adjust the switching frequency to adjust the output current based on the comparison between the output current and the output current reference.

The limits calculator 320 may calculate the duty-cycle limits and the switching frequency limits to decouple generation of the output current from the duty-cycle, and operate the boost converter in discontinuous current mode (DCM) and the clamped series resonant converter in discontinuous conduction mode (DCM). The CSRC 306 may include a resonant inductor, a transformer, a first diode and a second diode and a resonant capacitor (not shown), and the boost converter 310 may include a bulk capacitor and an input inductor (not shown).

The digital controller 316 may further include a control parameters calculator to calculate control parameters including bulk voltage parameters and output current parameters to determine and/or use to control the CF-CSRC 312 in a region of operation (e.g., boost converter and CSRC in discontinuous conduction mode (DCM). The control parameters calculator 330 and/or the dynamic digital filter 332 (e.g., the bulk voltage dynamic digital filter 326) may conduct a comparison between the bulk voltage and the bulk voltage reference (e.g., bulk voltage at a first time and a second time). The control parameters calculator 330 and/or the dynamic digital filter 332 may determine a steady-state when the bulk voltage stabilizes based on the comparison between the bulk voltage and the bulk voltage reference, and/or bulk voltage parameters and/or the output current parameters, and slow adjustment of the duty-cycle relative to adjustment of the switching frequency (e.g., adjust the duty-cycle at a slower rate relative to a rate of adjusting the switching frequency).

The control parameters calculator 330 and/or the dynamic digital filter 332 (e.g., the output current dynamic digital filter 328) may conduct a comparison between the output current and an output current reference (e.g., output current at a first time and a second time) to determine a transient-state when the output current changes based on the comparison between the output current and an output current reference (e.g., output current at a first time and a second time) and/or the bulk voltage parameters and the output current parameters. The control parameters calculator 330 and/or the dynamic digital filter 332 may slow adjustment of the switching frequency relative to adjustment of the duty-cycle (e.g., adjust the switching frequency at a slower rate relative to a rate of adjusting the duty-cycle). Conversely, during steady-state of the bulk voltage and/or the output current, the control parameters calculator 330 and/or the dynamic digital filter 332 may adjust the rate of adjustment of the switching frequency to a faster rate relative to a rate of adjustment of the duty-cycle.

The processor 302 may include one or more cores 334, 336, for any type of processor, such as a micro-processor, an embedded processor, a digital signal processor (DSP), a network processor, or other device to execute code. The one or more cores 334, 336 may be a single-threaded core or, for at least one embodiment, the one or more cores 334, 336 may be multithreaded in that the one or more cores 334, 336 may include more than one hardware thread context (or "logical processor") per core.

The memory 304 may be any of a wide variety of memories (including various layers of memory hierarchy) as are known or otherwise available to those of skill in the art. The memory 304 may include one or more code instruction (s) (e.g., logic implementing one or more components of the digital controller 316) to be executed by the processor 302, wherein the code may implement the method 400 (FIG. 4), discussed below.

Some embodiments of the processor 302 may include a number of execution units dedicated to specific functions or sets of functions. Other embodiments may include only one execution unit or one execution unit that can perform a particular function.

Although not illustrated in FIG. 3, a processing element may include other elements on chip with the processor 302. For example, a processing element may include memory control logic along with the processor 302. The processing element may include I/O control logic and/or may include I/O control logic integrated with memory control logic. The processing element may also include one or more caches 338.

Figure 4A:
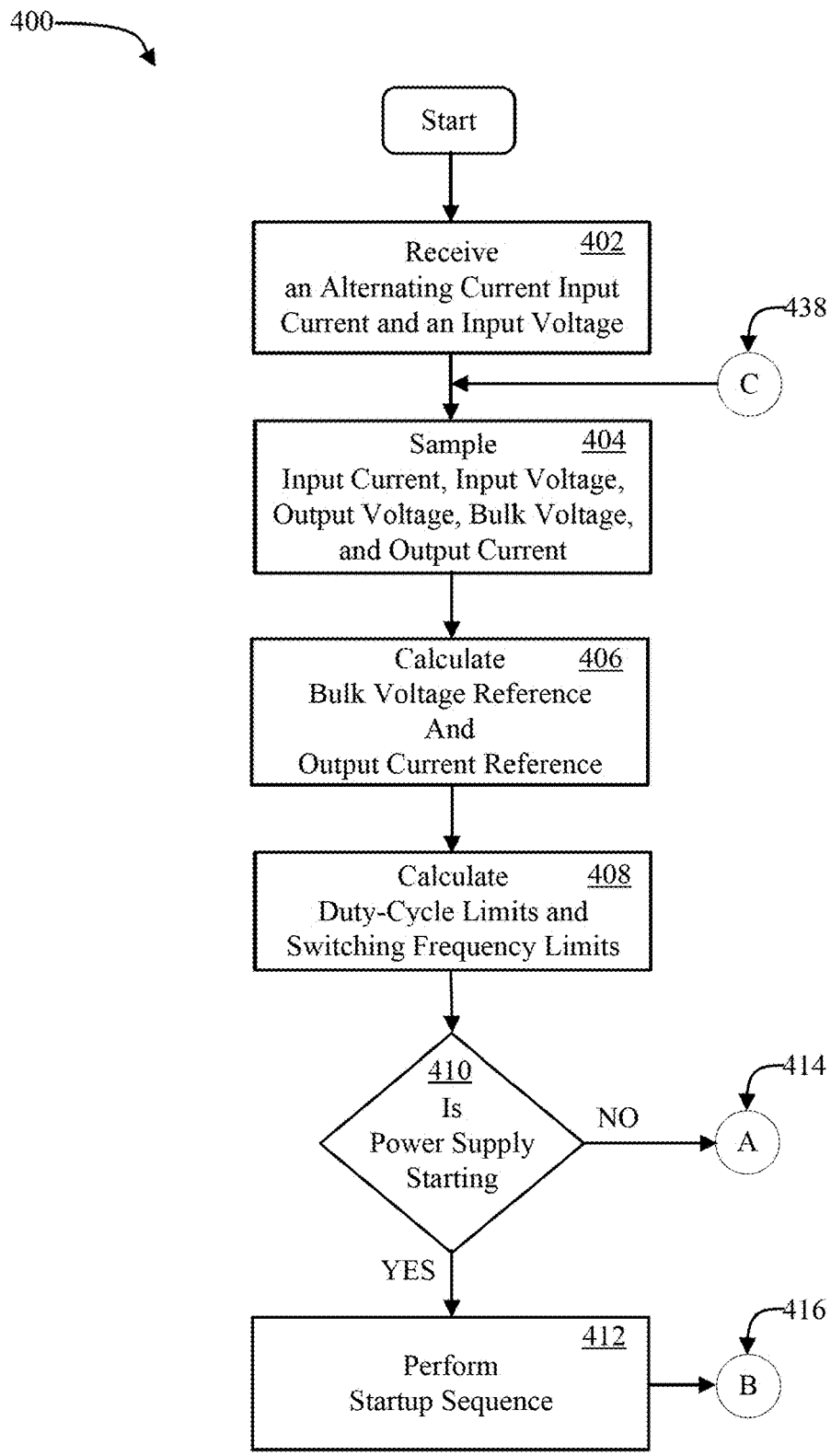
FIGS. 4A and 4B are flowcharts of an example of a method of maintaining a CF-CSRC system in a region of operation according to an embodiment.
Figure 4B:
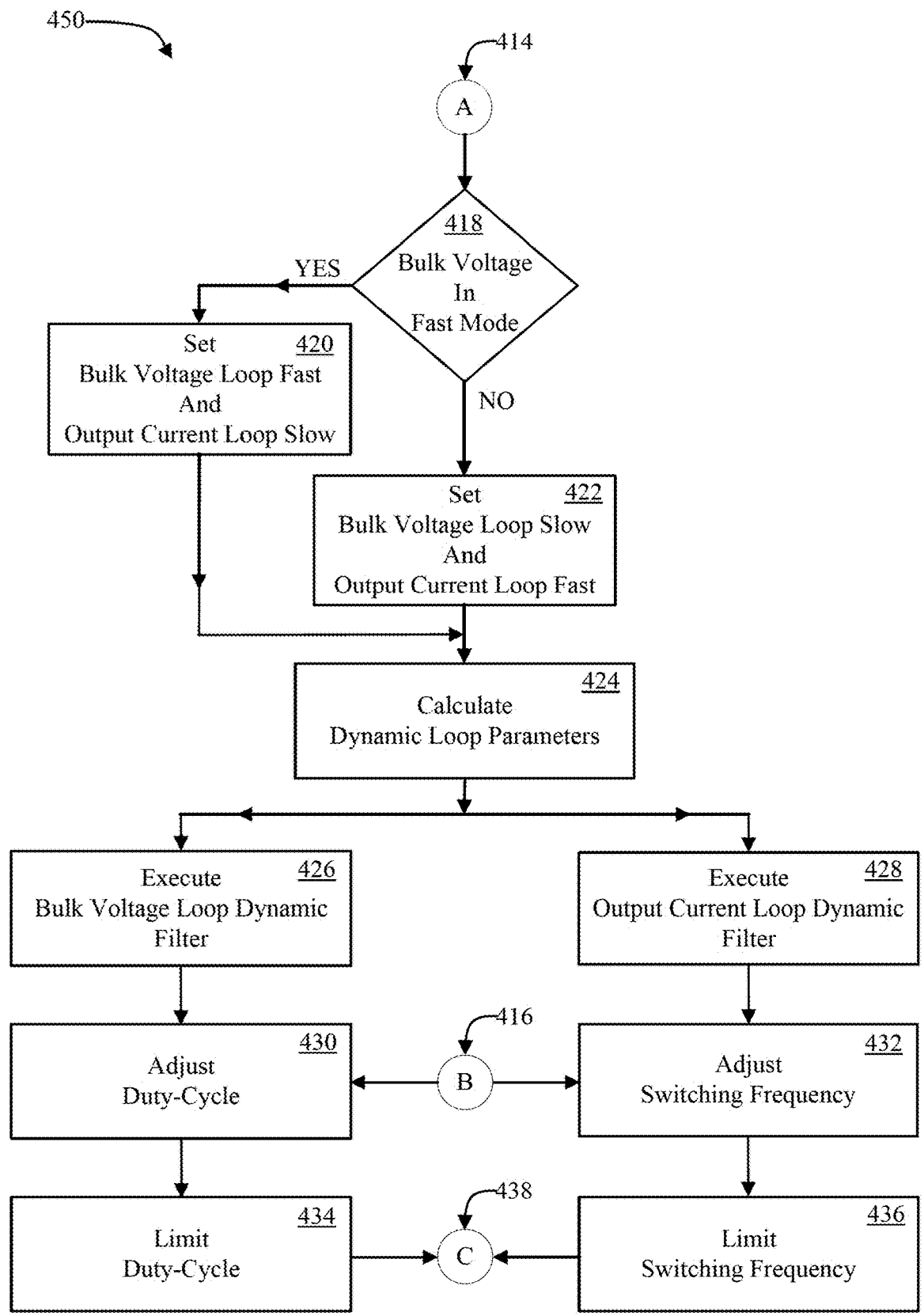

Turning now to FIGS. 4A and 4B, flowcharts 400 and 450 illustrate an example of a method of maintaining a CF-CSRC system in a region of operation (e.g., boost converter and CSRC in discontinuous conduction mode (DCM)) according to an embodiment. The method 400 may generally be implemented in a CF-CSRC such as, for example, the CF-CSRC system 100 (FIG. 1), the CF-CSRC 200 (FIG. 2) and/or the CF-CSRC 300 (FIG. 3), already discussed. More particularly, the method 400 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 400 may be written in any combination of one or more programming languages, including an object oriented programming language such as C++ or the like and conventional procedural programming languages, such as the "C" programming language or similar programming languages.

Illustrated processing block 402 provides for receiving an alternating current input current and an input voltage from an electrical power supply. Illustrated processing block 404 provides for sampling the input current, input voltage, output voltage, bulk voltage and output current (e.g., as part of a feedback control loop(s) discussed below). Illustrated processing block 406 provides for calculating a bulk voltage reference and output current reference. Illustrated processing block 408 provides for calculating duty-cycle limits and switching frequency limits for a region of operation (e.g., boost converter and CSRC in discontinuous conduction mode (DCM)). In an embodiment, a region of operation calculator may be used to determine the duty-cycle limits and switching frequency limits. The duty-cycle limits and the switching frequency limits may be calculated to decouple generation of the output current from the duty-cycle (e.g., to operate in DCM).

Illustrated processing block 410 provides for determining whether the powers supply is starting (e.g., beginning operation) or already in operation. During startup of the power supply, the output voltage may be less than an output voltage minimum, the output current may be less than an output current minimum, and the bulk voltage may be less than a bulk voltage minimum.

When the power supply is starting (e.g., not already been operating), illustrated processing block 412 provides for performing a startup sequence (e.g., to ready the CF-CSRC system for operation), converting the input current and the input voltage to direct current based on a duty-cycle and a switching frequency for a first switch and a second switch, and generating a bulk voltage based on the duty-cycle and the switching frequency, and generating an output current based on the switching frequency by actuating a first switch and a second switch of the CF-CSRC system at the switching frequency and the duty-cycle. The duty-cycle and the switching frequency may be actuated, for example, by a digital controller based on the switching frequency limits and the duty-cycle limits.

Upon completion of the startup sequence at 416, illustrated processing block 430 provides for adjusting the duty-cycle and illustrated processing block 432 provides for adjusting the switching frequency (e.g., to operate in DCM). Illustrated processing block 434 provides for conducting a comparison between the duty-cycle and duty-cycle limits and further adjusting the duty-cycle based on the comparison between the duty-cycle and duty-cycle limits (e.g., if the duty-cycle is approximately at or outside one or more of the duty-cycle limits). Illustrated processing block 436 provides for conducting a comparison between the switching frequency and the switching frequency limits and further adjusting the switching frequency based on the comparison between the switching frequency and the switching frequency limits (e.g., if the switching frequency is approximately at or outside one or more of the switching frequency limits). Upon completion of the duty-cycle limits and switching frequency limits analysis and/or adjustments to the duty-cycle and the switching frequency at 438, sampling is performed of the input current, input voltage, output voltage, bulk voltage and output current (e.g., as part of a feedback control loop(s) discussed below) to dynamically control operations in a region (e.g., to operate in DCM).

When the power supply is determined to be operating (e.g., not starting up and/or beginning operation) at 414, illustrated processing block 418 provides for determining whether the bulk voltage is in fast mode or slow mode. When the bulk voltage is in fast mode, illustrated processing block 420 provides for setting the bulk voltage loop to fast and setting the output current loop to slow. When the bulk voltage is not in fast mode, illustrated processing block 422 provides for setting the bulk voltage loop to slow and setting the output current loop to fast.

Illustrated processing block 424 provides for calculating dynamic loop parameters (e.g., control parameters) to determine and/or use to control the CF-CSRC system in a region of operation (e.g., boost converter and CSRC in discontinuous conduction mode (DCM)).

Illustrated processing block 426 provides for executing the bulk voltage loop dynamic filter (e.g., bulk voltage dynamic digital filter (controller), such as a proportional-integral (PI) filter) to sample the bulk voltage at a first time and a second time and/or compare the bulk voltage to the bulk voltage reference. When the bulk voltage is in a steady-state (e.g., when the bulk voltage stabilizes) based on the comparison between the bulk voltage and the bulk voltage reference (e.g., bulk voltage at a first time and a second time), adjustment of the duty-cycle is slow relative to adjustment of the switching frequency (e.g., adjusting the duty-cycle at a slower rate relative to a rate of adjusting the switching frequency). During steady-state of the bulk voltage and/or the output current, adjustment of the switching frequency may be at a faster rate relative to a rate of adjustment of the duty-cycle. Conversely, during transient state of the bulk voltage and/or the output current, adjustment of the duty-cycle may be at a faster rate relative to a rate of adjustment of the switching frequency.

Illustrated processing block 428 provides for executing the output current loop dynamic filter (e.g., output current dynamic digital filter (controller)), such as a proportional-integral (PI) filter) to sample the output current at a first time and a second time and/or compare the output current to the output current reference. When the output current is in a transient-state (e.g., when output current changes) based on the comparison between the output current and the output current reference (e.g., output current at a first time and a second time), adjustment of the switching frequency is slow relative to adjustment of duty-cycle (e.g., adjust the switching frequency at a slower rate relative to a rate of adjusting the duty-cycle). During transient-state of the bulk voltage and/or the output current, adjustment of the switching frequency may be at a slower rate relative to a rate of adjustment of the duty-cycle. Conversely, during steady-state of the bulk voltage and/or the output current, adjustment of the switching frequency may be at a faster rate relative to a rate of adjustment of the duty.

Turning now to FIGS. 5A, 5B and 5C, illustrations are shown of examples of waveforms for an inductor resonant current 500, a lower switch gate signal 520 and an upper switch gate signal 540 according to an embodiment. The CF-CSRC may operate an upper switch and lower switch between a maximum duty-cycle and minimum duty-cycle to ensure the boost and CSRC converters operate in discontinuous conduction mode (DCM) mode, so that for a given bulk voltage, the duration of inductor resonant current 500 may be constant. The inductor resonant current 500 waveform illustrates the inductor resonant current in DCM, which ensures that the output current is independent of duty-cycle. The maximum duty-cycle and minimum duty-cycle for the upper switch and lower switch enable the current pulse to not be cut by the switching of the upper and lower switches.

Turning now to FIGS. 6A, 6B and 6C, illustrations are shown of examples of waveforms for an inductor current 600 and an input current 620, and a lower switch gate signal 640 in discontinuous conduction mode (DCM) according to an embodiment. The CF-CSRC may operate with the input current in DCM, as illustrated in the input current 620 waveform, in order to maintain input power quality and maintain the boost converter so that the peak input voltage may be below the bulk voltage. As illustrated in FIG. 6C, the lower switch gate signal 640 may operate between a maximum switching frequency and minimum switching frequency.

Figure 7:
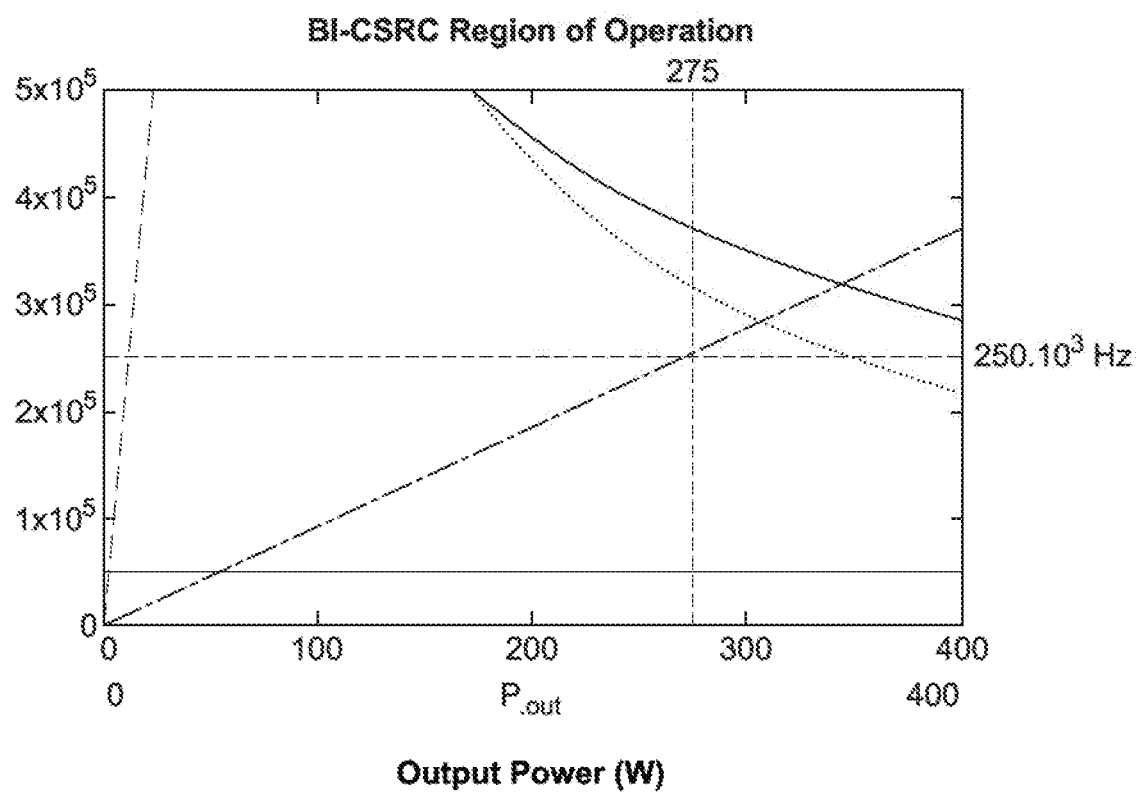
FIG. 7 is an illustration of an example graph of a region of operation in DCM for a low-line input voltage and high bulk voltage according to an embodiment.

Turning now to FIG. 7, graph 700 illustrates an example of a region of operation in DCM for a low-line input voltage (e.g., 90 Vac) and high bulk voltage (e.g., 600V).

Figure 8:
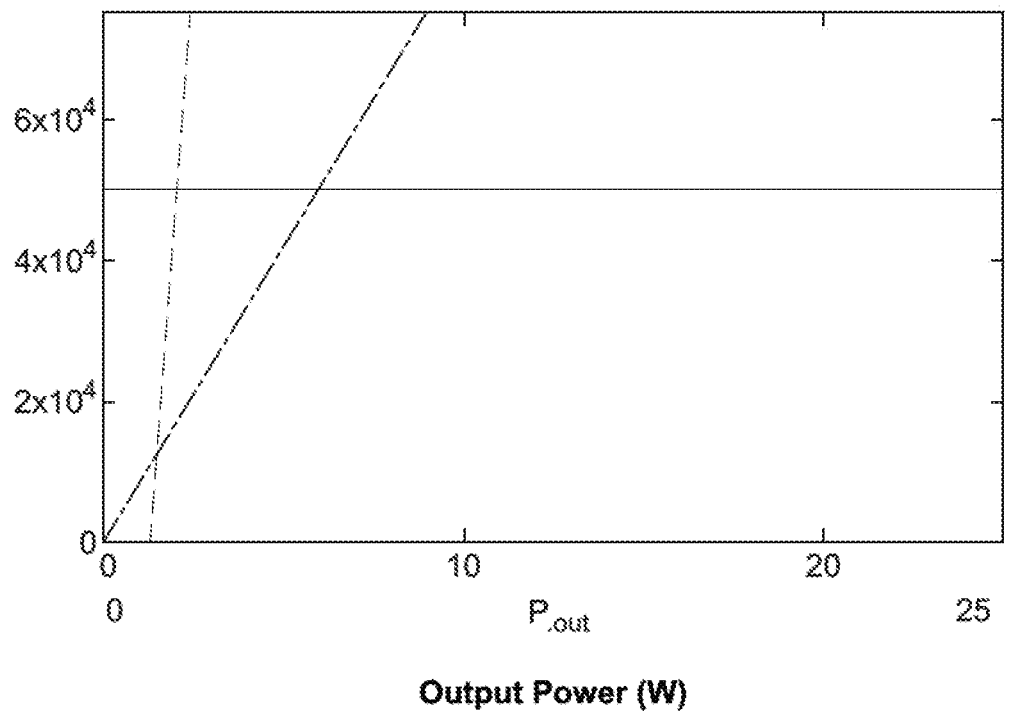
FIG. 8 is an illustration of an example graph of a region of operation in DCM for a low-line input voltage and low bulk voltage according to an embodiment.

Turning now to FIG. 8, graph 800 illustrates an example of a region of operation in DCM for the CF-CSRC using a low-line input voltage (e.g., 90 Vac) and low bulk voltage (e.g., 200V).

Figure 9:
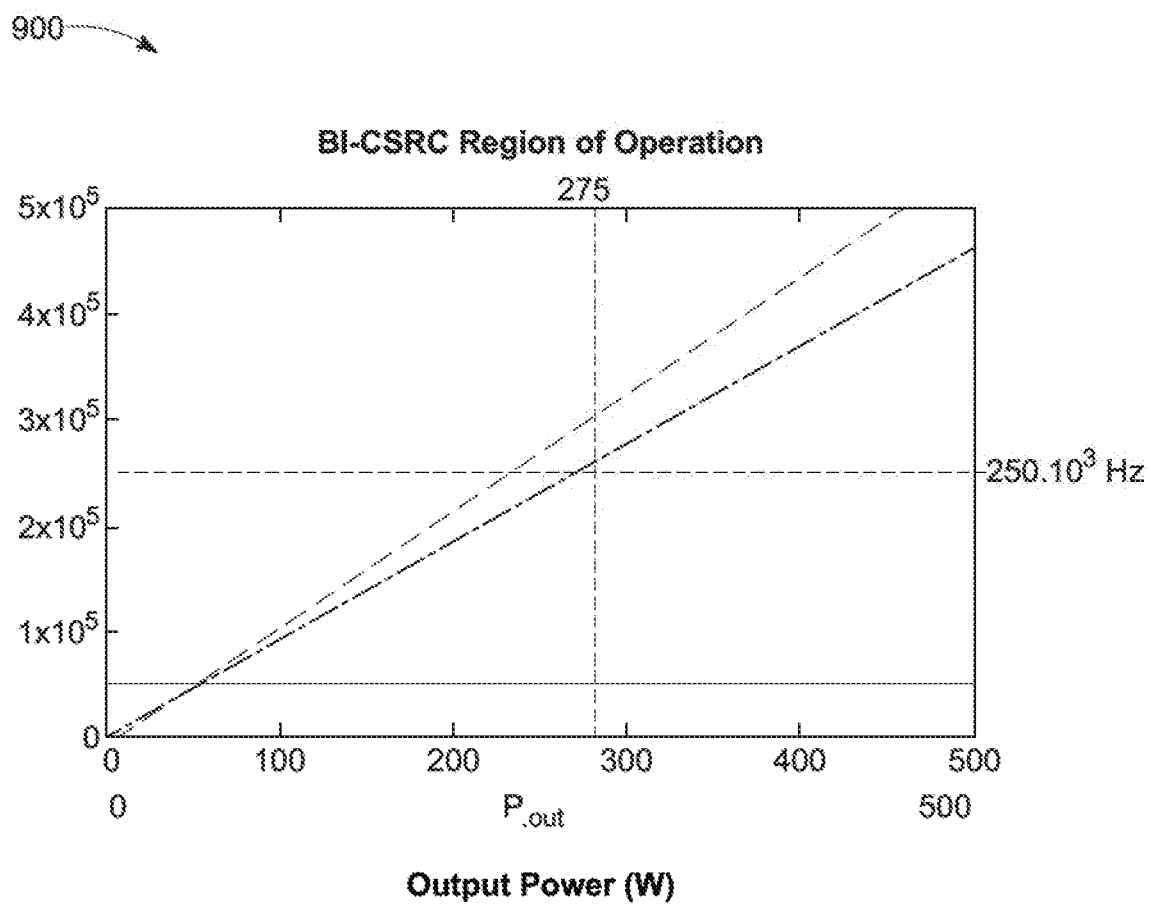
FIG. 9 is an illustration of an example graph of a region of operation in DCM for a high-line input voltage and high bulk voltage according to an embodiment.

Turning now to FIG. 9, graph 900 illustrates an example of a region of operation in DCM for the CF-CSRC using a high-line input voltage (e.g., 350 Vac) and high bulk voltage (e.g., 600V).

Figure 10:
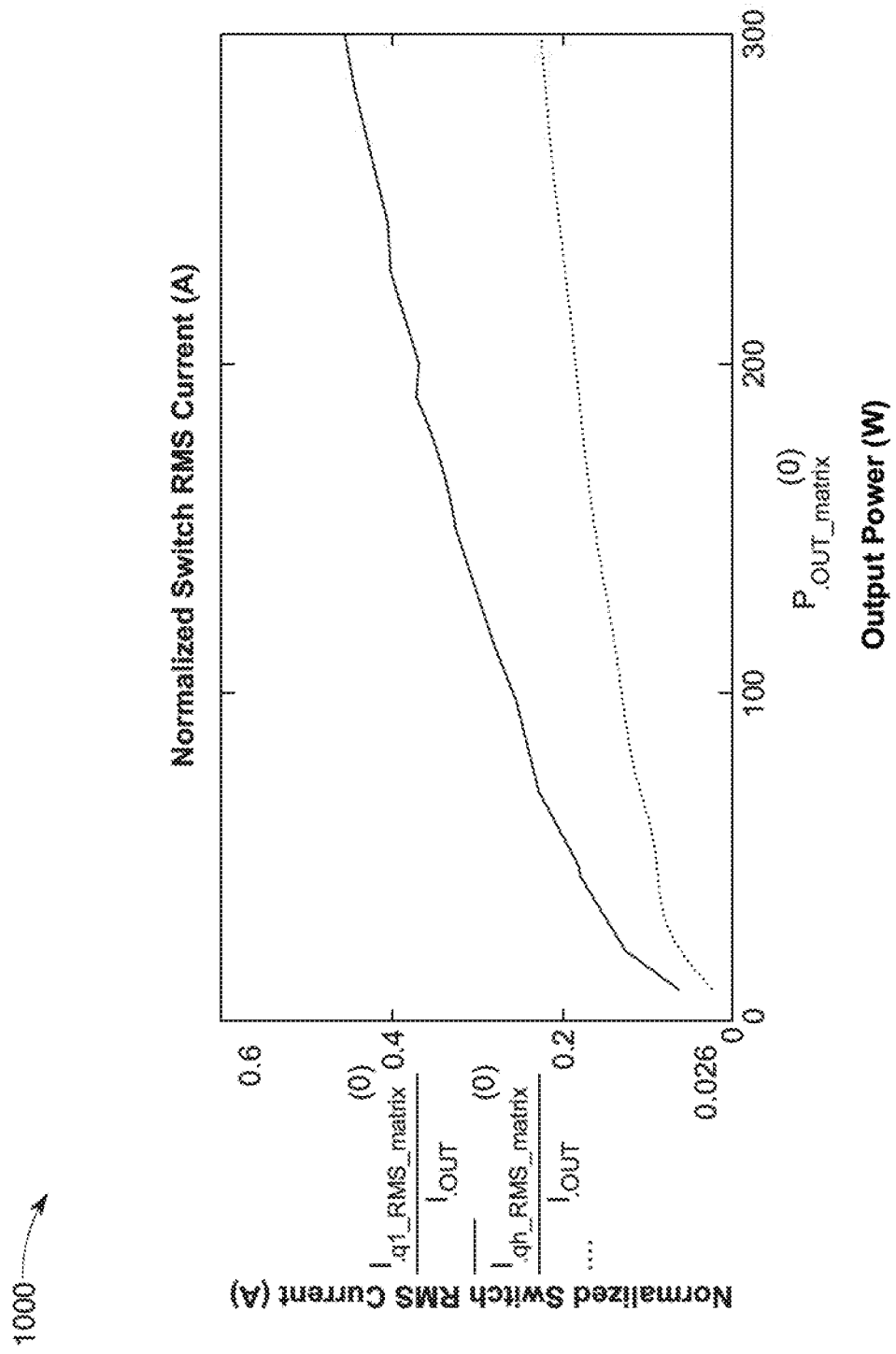
FIG. 10 is an illustration of an example graph of normalized switch root means square (RMS) currents according to an embodiment.

Turning now to FIG. 10, graph 1000 illustrates an example graph of normalized switch root means square (RMS) currents according to an embodiment. Two normalized switch RMS currents are illustrated as examples that may be produced by a CF-CSRC using operating parameters as illustrated in FIG. 11, discussed below, where normalized switch RMS $I = I_{ql\_RMS\_matrix}/I_{OUT}$ and $I_{qh\_RMS\_matrix}/I_{OUT}$, Output Power $(W) = P_{OUT\_matrix}$.

Turning now to FIG. 11, graph 1100 illustrates an example table of operating parameters and performance metrics according to an embodiment. Under low-line operation, the bulk voltage may be increased to increase the output power range of the converter. The bulk voltage may not be reduced under high-line operation, because the bulk voltage may need to be maintained above the input peak line.

The current-fed clamped series resonant converter (CF-CSRC) system eliminates (e.g., minimizes) 60 Hz output ripple (e.g., DC current may be flat with stable output current regulation, under 5% ripple and may be approximately zero ripple) and may provide 10 to 1 power range on universal input voltage. Instead of using the rectified AC line as the input of a resonant stage circuit, the CF-CSRC system may use the DC voltage (e.g., bulk voltage at a bulk capacitor) created by an integrated boost converter. The CF-CSRC system may provide a power converter topology for single-stage LED driver applications with power factor correction and low output voltage/current ripple. For LED applications, the CF-CSRC system may reduce cost, size of the CF-CSRC system (e.g., number of components) and increase reliability, maintain (e.g., at a minimum) the level of performance in terms of power efficiency, input power quality, limiting and/or eliminating output current ripple and increasing input/output operating range.

The CF-CSRC system combines the intrinsic advantages of a classical CSRC and mitigates drawbacks using an integrated boost input current shaper circuit. The CF-CSRC system topology may be superior to the classical CSRC in several regards, including boost-like input current that enables unity PFC and low THD. The CF-CSRC system may use boost-like input current to greatly reduce the high RMS input current problem of the classical CSRC. The CF-CSRC system may be integrated with a bulk DC capacitor that enables the CF-CSRC system to solve the input current dead-band problem of the classical CSRC. The CF-CSRC system may employ double modulation control on the duty-cycle and switching frequency to eliminate the output current ripple of typical LED drivers.

The CF-CSRC system may include zero voltage switching (ZVS) and zero-current switching (ZCS) on half-bridge switches, and an integrated DC-link capacitor. The CF-CSRC system provides low-cost, low-component count and small form-factor, and may remove electrolytic capacitors.

For simplicity, the duty-cycle limitations may be mathematically transformed into switching frequency limits, because duty-cycle (D) and switching frequency (Fsw) may be correlated. The CF-CSRC may be maintained in a region of operation (e.g., boost and CSRC in discontinuous conduction mode (DCM)) that decouples control variables (e.g., duty-cycle (D) and switching frequency (Fsw)) to ensure stability and simplify control of the CF-CSRC. The CF-CSRC may maintain the region of operation with the relationships of the output current as a function of the switching frequency (e.g., Iout=fct(Fsw)) and the bulk voltage as a function of duty-cycle and switching frequency (e.g., Vbulk=fct(D, Fsw)).

ADDITIONAL NOTES AND EXAMPLES

Example 1 may include an apparatus comprising a first switch; a second switch; a clamped series resonant converter to receive an alternating current input current and an input voltage from an electrical power supply, and convert the input current and the input voltage to direct current based on a duty-cycle and a switching frequency for the first switch and the second switch; and a boost converter to generate a bulk voltage based on the duty-cycle and the switching frequency, and generate an output current based on the switching frequency.

Example 2 may include the apparatus of Example 1, further comprising an output capacitor where the apparatus generates the output current; and a digital controller to control actuation of the first switch and the second switch at the switching frequency and the duty-cycle, the digital controller comprising: a limits calculator to calculate duty-cycle limits and switching frequency limits based on operating conditions for the first switch and the second switch; a duty-cycle limiter to limit the duty-cycle based on the duty-cycle limits; and a switching frequency limiter to limit the switching frequency based on the switching frequency limits.

Example 3 may include the apparatus of Example 2, wherein the boost converter, the clamped series resonant converter, the first switch, and the second switch are coupled to the digital controller in a single stage topology.

Example 4 may include the apparatus of Example 3, wherein the digital controller further comprises: a bulk voltage controller to conduct a comparison between the bulk voltage and a bulk voltage reference, wherein the switching frequency limiter adjusts the switching frequency and the duty-cycle limiter adjusts the duty-cycle to adjust the bulk voltage based on the comparison between the bulk voltage and the bulk voltage reference.

Example 5 may include the apparatus of Example 3, wherein the digital controller further comprises: an output current controller to conduct a comparison between the output current and an output current reference, wherein the switching frequency limiter adjusts the switching frequency to adjust the output current based on the comparison between the output current and the output current reference, and wherein increasing the switching frequency increases the output current.

Example 6 may include the apparatus of Example 3, wherein the limits calculator calculates the duty-cycle limits and the switching frequency limits to decouple generation of the output current from the duty-cycle; the boost converter and the clamped series resonant converter operate in discontinuous conduction mode (DCM); the clamped series resonant converter includes a resonant inductor, a transformer, a first diode and a second diode and a resonant capacitor; and the boost converter includes, a bulk capacitor of the boost converter, and an input inductor.

Example 7 may include the apparatus of Example 3, wherein the digital controller further comprises a control parameters calculator to: conduct a comparison between the bulk voltage at a first time and a second time, and a comparison between the output current at the first time and the second time; determine a steady-state when the bulk voltage and the output current stabilize based on the comparison between the bulk voltage at the first time and the second time, and the comparison between the output current at the first time and the second time; and adjust the duty-cycle at a slower rate relative to a rate of adjusting the switching frequency.

Example 8 may include the apparatus of Example 3, wherein the digital controller further comprises a control parameters calculator to: conduct a comparison between the bulk voltage at a first time and a second time, and a comparison between the output current at the first time and the second time; determine a transient state when the bulk voltage and the output current are changing based on the comparison between the bulk voltage at the first time and the second time, and the comparison between the output current at the first time and the second time; and adjust the duty-cycle at a faster rate relative to a rate of adjusting the switching frequency.

Example 9 may include a system comprising a processor and memory coupled to the processor, a first switch; a second switch; a clamped series resonant converter to receive an alternating current input current and an input voltage from an electrical power supply, and convert the input current and the input voltage to direct current based on a duty-cycle and a switching frequency for the first switch and the second switch; and a boost converter to generate a bulk voltage based on the duty-cycle and the switching frequency, and generate an output current based on the switching frequency.

Example 10 may include the system of Example 9, further comprising an output capacitor where the apparatus generates the output current; and a digital controller to control actuation of the first switch and the second switch at the switching frequency and the duty-cycle, the digital controller comprising: a limits calculator to calculate duty-cycle limits and switching frequency limits based on operating conditions for the first switch and the second switch; a duty-cycle limiter to limit the duty-cycle based on the duty-cycle limits; and a switching frequency limiter to limit the switching frequency based on the switching frequency limits.

Example 11 may include the system of Example 9, wherein the boost converter, the clamped series resonant converter, the first switch, and the second switch are coupled to the digital controller in a single stage topology.

Example 12 may include the system of Example 11, wherein the digital controller further comprises: a bulk voltage controller to conduct a comparison between the bulk voltage and a bulk voltage reference, wherein the switching frequency limiter adjusts the switching frequency and the duty-cycle limiter adjusts the duty-cycle to adjust the bulk voltage based on the comparison between the bulk voltage and the bulk voltage reference.

Example 13 may include the system of Example 11, wherein the digital controller further comprises: an output current controller to conduct a comparison between the output current and an output current reference, wherein the switching frequency limiter adjusts the switching frequency to adjust the output current based on the comparison between the output current and the output current reference, and wherein increasing the switching frequency increases the output current.

Example 14 may include the system of Example 11, wherein the limits calculator calculates the duty-cycle limits and the switching frequency limits to decouple generation of the output current from the duty-cycle; the boost converter and the clamped series resonant converter operate in discontinuous conduction mode (DCM); the clamped series resonant converter includes a resonant inductor, a transformer, a first diode and a second diode and a resonant capacitor; and the boost converter includes, a bulk capacitor of the boost converter, and an input inductor.

Example 15 may include the system of Example 11, wherein the digital controller further comprises a control parameters calculator to: conduct a comparison between the bulk voltage at a first time and a second time, and a comparison between the output current at the first time and the second time; determine a steady-state when the bulk voltage and the output current stabilize based on the comparison between the bulk voltage at the first time and the second time, and the comparison between the output current at the first time and the second time; and adjust the duty-cycle at a slower rate relative to a rate of adjusting the switching frequency.

Example 16 may include the system of Example 11, wherein the digital controller further comprises a control parameters calculator to: conduct a comparison between the bulk voltage at a first time and a second time, and a comparison between the output current at the first time and the second time; determine a transient state when the bulk voltage and the output current are changing based on the comparison between the bulk voltage at the first time and the second time, and the comparison between the output current at the first time and the second time; and adjust the duty-cycle at a faster rate relative to a rate of adjusting the switching frequency.

Example 17 may include a method comprising receiving an alternating current input current and an input voltage from an electrical power supply; converting the input current and the input voltage to direct current based on a duty-cycle and a switching frequency for a first switch and a second switch; and generating a bulk voltage based on the duty-cycle and the switching frequency, and generating an output current based on the switching frequency.

Example 18 may include the method of Example 17, further comprising: calculating duty-cycle limits and switching frequency limits based on operating conditions for the first switch and the second switch; and actuating the first switch and the second switch at the switching frequency and the duty-cycle using a digital controller based on the switching frequency limits and the duty-cycle limits, wherein the switching frequency limits and the duty-cycle limits are based on the bulk voltage and the input voltage.

Example 19 may include the method of Example 17, further comprising: conducting a comparison between the bulk voltage and a bulk voltage reference; and adjusting the duty-cycle and the switching frequency to adjust the bulk voltage based on the comparison between the bulk voltage and the bulk voltage reference.

Example 20 may include the method of Example 17, further comprising: conducting a comparison between the bulk voltage at a first time and a second time, and a comparison between the output current at the first time and the second time; determining a steady-state when the bulk voltage and the output current stabilize based on the comparison between the bulk voltage at the first time and the second time, and the comparison between the output current at the first time and the second time; and adjusting the duty-cycle at a slower rate relative to a rate of adjusting the switching frequency.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, the manufactured of devices of smaller size is expected. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments may be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" or "at least one of" may mean any combination of the listed terms. For example, the phrases "one or more of A, B or C" may mean A; B; C; A and B; A and C; B and C; or A, B and C. In addition, a list of items joined by the term "and so forth", "and so on", or "etc." may mean any combination of the listed terms as well any combination with other terms.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An apparatus, comprising:
a first switch;
a second switch;
a clamped series resonant converter to receive an alternating current input current and an input voltage from an electrical power supply, and convert the input current and the input voltage to direct current based on a duty-cycle and a switching frequency for the first switch and the second switch;
a boost converter to generate a bulk voltage based on the duty-cycle and the switching frequency, and generate an output current based on the switching frequency; and
a digital controller to control actuation of the first switch and the second switch at the switching frequency and the duty-cycle, the digital controller comprising:
a limits calculator to calculate duty-cycle limits, switching frequency limits based on operating conditions for the first switch and the second switch, and to maintain the generation of the bulk voltage at an output voltage level below an input voltage level of the input voltage from the electrical power supply;
a duty-cycle limiter to limit the duty-cycle based on the duty-cycle limits; and
a switching frequency limiter to limit the switching frequency based on the switching frequency limits.

2. The apparatus of claim 1, further comprising:
an output capacitor where the apparatus generates the output current.

3. The apparatus of claim 1, wherein the boost converter, the clamped series resonant converter, the first switch, and the second switch are coupled to the digital controller in a single stage topology.

4. The apparatus of claim 3, wherein the digital controller further comprises:
a bulk voltage controller to conduct a comparison between the bulk voltage and a bulk voltage reference,
wherein the switching frequency limiter adjusts the switching frequency and the duty-cycle limiter adjusts the duty-cycle to adjust the bulk voltage based on the comparison between the bulk voltage and the bulk voltage reference.

5. The apparatus of claim 3, wherein the digital controller further comprises:
an output current controller to conduct a comparison between the output current and an output current reference,
wherein the switching frequency limiter adjusts the switching frequency to adjust the output current based on the comparison between the output current and the output current reference, and wherein increasing the switching frequency increases the output current.

6. The apparatus of claim 3, wherein:
the limits calculator calculates the duty-cycle limits and the switching frequency limits to decouple generation of the output current from the duty-cycle;
the boost converter and the clamped series resonant converter operate in discontinuous conduction mode (DCM);
the clamped series resonant converter includes a resonant inductor, a transformer, a first diode and a second diode and a resonant capacitor; and
the boost converter includes, a bulk capacitor of the boost converter, and an input inductor.

7. The apparatus of claim 3, wherein the digital controller further comprises a control parameters calculator to:
conduct a comparison between the bulk voltage at a first time and a second time, and a comparison between the output current at the first time and the second time;
determine a steady-state when the bulk voltage and the output current stabilize based on the comparison between the bulk voltage at the first time and the second time, and the comparison between the output current at the first time and the second time; and
adjust the duty-cycle at a slower rate relative to a rate of adjusting the switching frequency.

8. The apparatus of claim 3, wherein the digital controller further comprises a control parameters calculator to:
conduct a comparison between the bulk voltage at a first time and a second time, and a comparison between the output current at the first time and the second time;
determine a transient state when the bulk voltage and the output current are changing based on the comparison between the bulk voltage at the first time and the second time, and the comparison between the output current at the first time and the second time; and adjust the duty-cycle at a faster rate relative to a rate of adjusting the switching frequency.

9. A system, comprising:
a processor and memory coupled to the processor;
a first switch;
a second switch;
a clamped series resonant converter to receive an alternating current input current and an input voltage from an electrical power supply, and convert the input current and the input voltage to direct current based on a duty-cycle and a switching frequency for the first switch and the second switch;
a boost converter to generate a bulk voltage based on the duty-cycle and the switching frequency, and generate an output current based on the switching frequency; and
a digital controller to control actuation of the first switch and the second switch at the switching frequency and the duty-cycle, the digital controller comprising:
a limits calculator to calculate duty-cycle limits, switching frequency limits based on operating conditions for the first switch and the second switch, and to maintain the generation of the bulk voltage at an output voltage level below an input voltage level of the input voltage from the electrical power supply;
a duty-cycle limiter to limit the duty-cycle based on the duty-cycle limits; and
a switching frequency limiter to limit the switching frequency based on the switching frequency limit.

10. The system of claim 9, further comprising an output capacitor where the system generates the output current.

11. The system of claim 9, wherein the boost converter, the clamped series resonant converter, the first switch, and the second switch are coupled to the digital controller in a single stage topology.

12. The system of claim 11, wherein the digital controller further comprises:
a bulk voltage controller to conduct a comparison between the bulk voltage and a bulk voltage reference,
wherein the switching frequency limiter adjusts the switching frequency and the duty-cycle limiter adjusts the duty-cycle to adjust the bulk voltage based on the comparison between the bulk voltage and the bulk voltage reference.

13. The system of claim 11, wherein the digital controller further comprises:
an output current controller to conduct a comparison between the output current and an output current reference,
wherein the switching frequency limiter adjusts the switching frequency to adjust the output current based on the comparison between the output current and the output current reference, and wherein increasing the switching frequency increases the output current.

14. The system of claim 11, wherein:
the limits calculator calculates the duty-cycle limits and the switching frequency limits to decouple generation of the output current from the duty-cycle;
the boost converter and the clamped series resonant converter operate in discontinuous conduction mode (DCM);
the clamped series resonant converter includes a resonant inductor, a transformer, a first diode and a second diode and a resonant capacitor; and
the boost converter includes, a bulk capacitor of the boost converter, and an input inductor.

15. The system of claim 11, wherein the digital controller further comprises a control parameters calculator to:
conduct a comparison between the bulk voltage at a first time and a second time, and a comparison between the output current at the first time and the second time;
determine a steady-state when the bulk voltage and the output current stabilize based on the comparison between the bulk voltage at the first time and the second time, and the comparison between the output current at the first time and the second time; and
adjust the duty-cycle at a slower rate relative to a rate of adjusting the switching frequency.

16. The system of claim 11, wherein the digital controller further comprises a control parameters calculator to:
conduct a comparison between the bulk voltage at a first time and a second time, and a comparison between the output current at the first time and the second time;
determine a transient state when the bulk voltage and the output current are changing based on the comparison between the bulk voltage at the first time and the second time, and the comparison between the output current at the first time and the second time; and
adjust the duty-cycle at a faster rate relative to a rate of adjusting the switching frequency.

17. A method, comprising:
receiving an alternating current input current and an input voltage from an electrical power supply;
converting the input current and the input voltage to direct current based on a duty-cycle and a switching frequency for a first switch and a second switch;
generating a bulk voltage based on the duty-cycle and the switching frequency, and generating an output current based on the switching frequency;
calculating duty-cycle limits and switching frequency limits based on operating conditions for the first switch and the second switch to maintain the generation of the bulk voltage at an output voltage level below an input voltage level of the input voltage from the electrical power supply; and
actuating the first switch and the second switch at the switching frequency and the duty-cycle using a digital controller based on the switching frequency limits and the duty-cycle limits.

18. The method of claim 17, wherein the switching frequency limits and the duty-cycle limits are based on the bulk voltage and the input voltage.

19. The method of claim 17, further comprising:
conducting a comparison between the bulk voltage and a bulk voltage reference; and
adjusting the duty-cycle and the switching frequency to adjust the bulk voltage based on the comparison between the bulk voltage and the bulk voltage reference.

20. The method of claim 17, further comprising:
conducting a comparison between the output current and an output current reference; and
adjusting the switching frequency to adjust the output current based on the comparison between the output current and the output current reference, wherein increasing the switching frequency increases the output current.

* * * * *